(12) United States Patent
Herbst

(10) Patent No.: US 8,136,893 B2
(45) Date of Patent: *Mar. 20, 2012

(54) CONTROL VALVE SYSTEM

(75) Inventor: Robert J. Herbst, Avon, OH (US)

(73) Assignee: Bendix Commerical Vehicle Systems LLC, Elyria, OH (US)

( * ) Notice: Subject to any disclaimer, the term of this patent is extended or adjusted under 35 U.S.C. 154(b) by 406 days.

This patent is subject to a terminal disclaimer.

(21) Appl. No.: 12/077,018

(22) Filed: Mar. 14, 2008

(65) Prior Publication Data

US 2008/0169701 A1    Jul. 17, 2008

Related U.S. Application Data

(63) Continuation of application No. 11/066,591, filed on Feb. 25, 2005, now Pat. No. 7,354,118.

(51) Int. Cl.
*B60T 8/34* (2006.01)
(52) U.S. Cl. ............... 303/118.1; 303/117.1; 303/119.1; 188/170
(58) Field of Classification Search .............. 303/117.1, 303/118.1, 119.1; 188/170; 137/625.63, 137/625.66, 625.64; 251/31
See application file for complete search history.

(56) References Cited

U.S. PATENT DOCUMENTS

| 3,833,269 A | 9/1974 | Trui et al. |
| 4,116,493 A | 9/1978 | Hayashide |
| 4,131,324 A | 12/1978 | Kurichh |
| 4,199,196 A | 4/1980 | Teluo |
| 4,247,154 A | 1/1981 | Shoji et al. |
| 4,284,308 A | 8/1981 | Hayashida |
| 4,313,642 A | 2/1982 | Berisch |
| 4,421,212 A | 12/1983 | Fleck |
| 4,435,019 A | 3/1984 | Hayashida |
| 4,493,510 A | 1/1985 | Delke et al. |

(Continued)

FOREIGN PATENT DOCUMENTS

DE    2134067    1/1973

(Continued)

OTHER PUBLICATIONS

One page describing PP-5 Control Valve with Pilot Air Release, Air System Components—Control Valves, p. 26, Bendix Commercial Vehicle Systems LLC.

(Continued)

*Primary Examiner* — Robert Siconolfi
*Assistant Examiner* — James Hsiao
(74) *Attorney, Agent, or Firm* — Eugene E. Clair; Cheryl L. Greenly

(57) ABSTRACT

A pneumatic brake system that includes at least one pneumatic latching valve; a single device, such as a solenoid, for providing momentary pilot signals to pneumatic latching valve; a source of pressurized supply air in communication with the pneumatic latching valve; a spring brake or other pneumatic device in communication with the pneumatic latching valve; and, optionally, an indicator device for monitoring and displaying the state of the pneumatic latching valve. Upon receiving a first momentary pilot signal the pneumatic latching valve changes from closed to open and delivers pressurized air to the spring brake. Upon receiving a second momentary pilot signal, the pneumatic latching valve changes from open to closed and exhausts pressurized air from the spring brake to the external environment. The valve remains "latched" in its current state until the signaling device is energized and the next momentary pilot signal is received.

2 Claims, 5 Drawing Sheets

U.S. PATENT DOCUMENTS

| | | | |
|---|---|---|---|
| 4,586,584 A | | 5/1986 | Auman et al. |
| 4,616,881 A | | 10/1986 | Muller et al. |
| 4,620,567 A | | 11/1986 | Kurtz |
| 4,638,837 A | | 1/1987 | Buike et al. |
| 4,758,811 A | | 7/1988 | Slavin et al. |
| 4,763,646 A | | 8/1988 | Lekholm |
| 4,878,464 A | * | 11/1989 | Richeson et al. .......... 123/90.11 |
| 4,900,098 A | | 2/1990 | Kuhn et al. |
| 4,963,692 A | | 10/1990 | Halabiya |
| 4,979,783 A | | 12/1990 | Johnson |
| 5,056,874 A | | 10/1991 | Hall, III |
| 5,061,015 A | * | 10/1991 | Cramer et al. .................... 303/7 |
| 5,172,958 A | | 12/1992 | Sell |
| 5,429,427 A | | 7/1995 | Gayfer |
| 5,584,465 A | | 12/1996 | Ochsenreiter |
| 5,788,338 A | | 8/1998 | Hart et al. |
| 5,927,327 A | | 7/1999 | Bezos et al. |
| 6,062,654 A | | 5/2000 | Becker et al. |
| 6,079,790 A | | 6/2000 | Broome |
| 6,129,115 A | | 10/2000 | Janssen et al. |
| 6,322,159 B1 | | 11/2001 | Eberling |
| 6,322,161 B1 | | 11/2001 | Maslonka et al. |
| 6,351,199 B1 | | 2/2002 | Perini |
| 6,450,587 B1 | | 9/2002 | MacGregor et al. |
| 6,488,343 B1 | | 12/2002 | Eberling et al. |
| 6,685,281 B2 | | 2/2004 | MacGregor et al. |
| 6,752,472 B2 | | 6/2004 | Bezzina |
| 6,896,339 B2 | | 5/2005 | Moffitt et al. |
| 2003/0075977 A1 | | 4/2003 | Heiler et al. |
| 2003/0218377 A1 | * | 11/2003 | Moffitt et al. ................. 303/127 |
| 2004/0012249 A1 | | 1/2004 | Koelzer et al. |
| 2004/0166863 A1 | | 8/2004 | Kim et al. |
| 2004/0187674 A1 | | 9/2004 | Bennett et al. |

FOREIGN PATENT DOCUMENTS

| | | |
|---|---|---|
| EP | 321 129 | 6/1989 |
| EP | 778188 | 6/1997 |
| WO | WO 01/14192 | 3/2001 |

OTHER PUBLICATIONS

One page describing PP-5 push pull control valves, p. 26.
Bendix brochure No. SD-03-3611, Bendix PP-1, PP-2, PP-5, PP-8 & RD-3 Push-Pull Type Control Valves, pp. 1-4, 2004, printed USA.
Bendix brochure No. SD-03-3415, MV-3 Dash Control Module, pp. 1-6 and back cover, Jan. 1999, printed USA.
International Search Report and Written Opinion from PCT/US2006/000542 dated Oct. 27, 2006.

* cited by examiner (CLOSED)

(OPEN)

(INTERMEDIATE)

(CLOSED)

US 8,136,893 B2

CONTROL VALVE SYSTEM

CROSS REFERENCE TO RELATED APPLICATIONS

This application is a continuation of the U.S. patent application entitled "Control Valve System," Ser. No. 11/066,591 filed Feb. 25, 2005, now U.S. Pat. No. 7,354,118, the entire disclosure of which is incorporated fully herein by reference.

TECHNICAL FIELD OF THE INVENTION

This invention relates in general to control devices for use with pneumatic or hydraulic systems, and in particular to a pneumatic latching valve that utilizes a single solenoid valve or functionally similar device for achieving change of state.

BACKGROUND OF THE INVENTION

Solenoids are electromechanical devices often used to convert electrical energy into mechanical energy and particularly into short stroke mechanical motion. As such, solenoids are frequently utilized for actuating valves in response to an electrical signal. For certain applications, valves must be positively maintained in predetermined positions to control the flow of gas or fluid through the valve. A first solenoid may be powered to positively move a valve to one position and a second solenoid may be powered to positively move the valve member to a predetermined position and maintain it there until the second solenoid is de-energized and the first solenoid is energized to move the valve member back to the other position. In situations where the valve is to be retained in the actuated position for significant time periods without continuous power or a sustained control signal, latching mechanisms may be used to hold the valve one position or the other. A remotely controlled pneumatic latching valve may use two solenoids to change operational states, i.e., supply to delivery and delivery to exhaust. Momentary activation of one solenoid actuates the pneumatic latching valve to deliver supply air while momentary activation of the other solenoid actuates the pneumatic latching valve to exhaust the delivered air pressure.

While basically effective for its intended purpose, the above-described system configuration is problematic in that the use of two solenoids to change the state of the pneumatic latching valve is expensive and redundant. Also undesirable is the additional size, weight, and plumbing complexity commonly found in this type of system. Thus, while the self-latching solenoid actuated pneumatic valves known in the related art have are generally useful, there continues to be a significant need for smaller, less complicated, and less expensive pneumatic latching valves. Furthermore, especially in the case of vehicle braking systems, there continues to be a need for a latching valve that will not undergo a change of state if power to the solenoids is lost or interrupted.

SUMMARY OF THE INVENTION

Deficiencies in and of the prior art are overcome by the present invention, the exemplary embodiment of which provides a control valve system for use with vehicle air brake systems and other systems that include pneumatic or hydraulic components. Thus, in accordance with a first aspect of the present invention, a pneumatic brake system is provided. This system includes at least one pneumatic latching valve; a single device for providing momentary pilot air signals to the pneumatic latching valve in fluid, i.e., pneumatic, communication with the latching valve; a source of pressurized air in fluid communication with the pneumatic latching valve; a spring brake or other pneumatic device in fluid communication with the pneumatic latching valve; and an indicator device for monitoring and displaying the state of the pneumatic latching valve. Upon receiving a first momentary pilot signal the pneumatic latching valve changes from closed to open and delivers pressurized air to the spring brake. Upon receiving a second momentary pilot signal, the pneumatic latching valve changes from open to closed and exhausts pressurized air from the spring brake to external environment. The valve remains "latched" in its current state until the signaling device is energized and the momentary pilot signal is received.

In accordance with another aspect of the present invention, a control valve is provided. This control valve is adapted to receive momentary pilot air signals from another device such as a single solenoid valve, for example, and changes from a first operational state to a second operational state in response to a first pilot air signal received from the solenoid valve. The control valve changes from the second operational state back to the first operational state only in response to a second signal received from the solenoid. In this embodiment, an electrically-powered solenoid valve acts as a "toggle switch" for changing the operational state of the control valve.

In accordance with still another aspect of the present invention, a pneumatic or hydraulic control valve is provided. This control valve includes a valve body, which further comprises: (i) a supply port, at least one delivery port, and at least one exhaust port; (ii) first and second pilot air inlets; (iii) a pilot air outlet; and (iv) an internal cavity comprising top, middle, and bottom chambers, wherein the top chamber is in communication with the first pilot air inlet and the pilot air outlet; the middle chamber is in communication with the supply port; and the bottom chamber is in communication with the delivery port, the exhaust port, and the second pilot air inlet. A first, or "select" piston is disposed within the top chamber and includes a bore that passes through its length. A biasing member is disposed within the top chamber beneath the select piston and urges the piston in an upward direction. A second, or "primary" piston is disposed within the top and middle chambers and defines an annular orifice therewith. Based on a momentary pilot signal input, the primary piston selectively engages the select piston. A valve member or "inlet exhaust valve" is connected to the bottom portion of the primary piston and a third or "auxiliary" piston is disposed within the bottom chamber beneath the valve member. In this embodiment, the various chambers are interconnected and, based on the relative positions of the various pistons, permit the passage of air from the supply port to the delivery port or from the delivery port to the exhaust port. The valve member is situated between the primary piston and the auxiliary piston and opens or closes the internal supply to delivery passageway.

Additional features and aspects of the present invention will become apparent to those of ordinary skill in the art upon reading and understanding the following detailed description of the exemplary embodiments. As will be appreciated, further embodiments of the invention are possible without departing from the scope and spirit of the invention. Accordingly, the drawings and associated descriptions are to be regarded as illustrative and not restrictive in nature.

BRIEF DESCRIPTION OF THE DRAWINGS

The accompanying drawings, which are incorporated into and form a part of the specification, schematically illustrate one or more exemplary embodiments of the invention and, together with the general description given above and detailed description of the preferred embodiments given below, serve to explain the principles of the invention.

DETAILED DESCRIPTION OF THE INVENTION

Figure 1A:
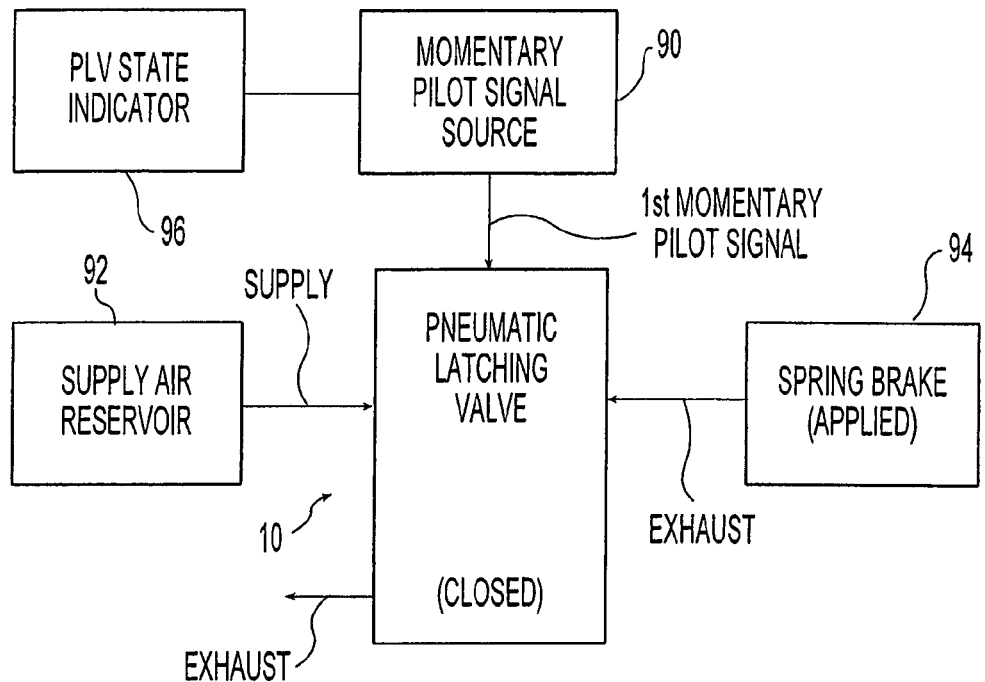
FIGS. 1A-B are schematic block diagrams of an exemplary embodiment of the pneumatic brake system of the present invention.
Figure 1B:
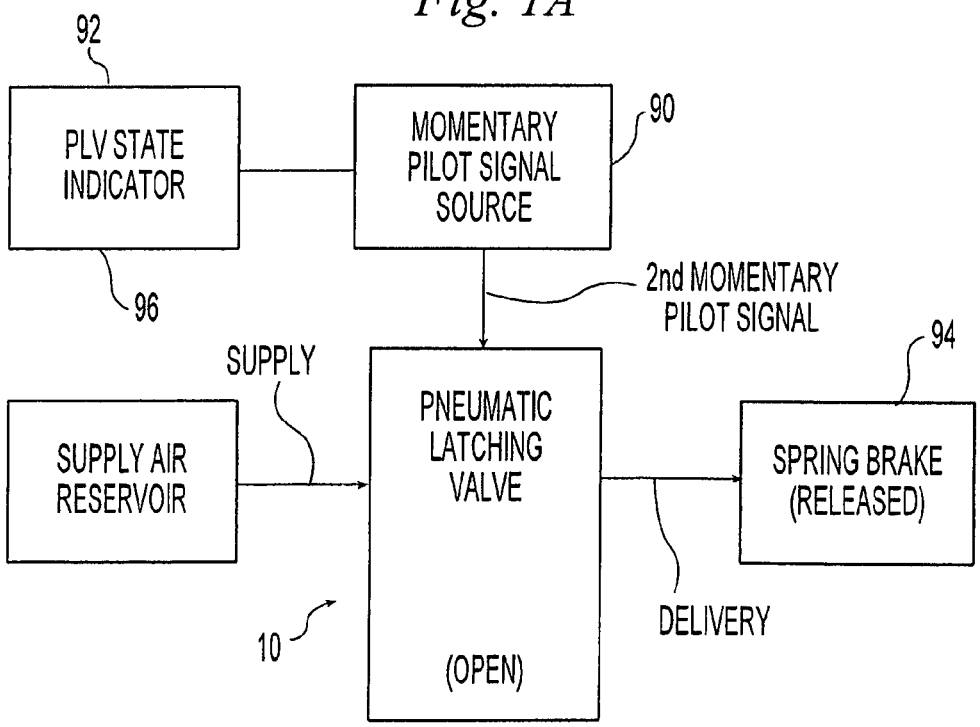

With reference to FIG. 1, a first exemplary embodiment of this invention relates to a pneumatic brake system that includes at least one pneumatic latching valve 10; a single toggle-like control device 90 for providing momentary pilot air signals to pneumatic latching valve 10 in fluid, i.e., pneumatic, communication with latching valve 10; a source of pressurized supply air 92 in fluid communication with pneumatic latching valve 10; a spring brake 94 or other pneumatic brake device in fluid communication with pneumatic latching valve 10; and an indicator device 96 for monitoring and displaying the state of the pneumatic latching valve. An electrically-powered solenoid in fluid communication with a source of pressurized air sufficient for creating a momentary pilot air signal may be utilized for control device 90. Upon receiving a first momentary pilot signal the pneumatic latching valve changes from closed to open and delivers pressurized air to the spring brake. Upon receiving a second momentary pilot signal, the pneumatic latching valve changes from open to closed and exhausts pressurized air from the spring brake to the external environment. The valve remains "latched" in its current state until the signaling device is energized and the next momentary pilot signal is received.

With reference to FIGS. 2-5, control valve 10, which in the exemplary embodiment is a pneumatic latching valve, includes a valve body 12, which further comprises: (i) a supply port 14, at least one delivery port 16, and at least one exhaust port 18; (ii) first and second pilot air inlets 20 and 24; (iii) a pilot air outlet 22; and (iv) an internal cavity comprising top, middle, and bottom chambers, wherein top chamber 26 is in communication with first pilot air inlet 20 and pilot air outlet 22; middle chamber 28 is in communication with supply port 14; and bottom chamber 30 is in communication with delivery port 16, exhaust port 18, and second pilot air inlet 24. A first, or "select" piston 40 is disposed within top chamber 26 and includes a bore 44 passing through its length. A biasing member 50 is disposed within top chamber 26 beneath select piston 40 and urges the piston in an upward direction. A second, or "primary" piston 60 is disposed within top chamber 26 and middle chamber 28 and defines an annular orifice 25 therewith. Based on the momentary pilot signal input, primary piston 60 selectively engages select piston 40. A valve member 80 or "inlet exhaust valve" is connected to the bottom portion of primary piston 60, and a third or "auxiliary/tripper" piston is disposed within the bottom chamber beneath valve member 80. The embodiment of control valve 10 shown in FIG. 5 includes a valve body 12 that is attachable to a pre-existing valve body such as that of the PP-5 valve (Bendix Commercial Vehicle Systems, Elyria, Ohio). The PP-5 includes additional biasing member 61 which returns primary piston 60 to the "up" position when the internal pressure falls below a predetermined value. Thus, although not shown, a second biasing member 61 may be included in the exemplary embodiment shown in the Figures for this purpose. Additionally, the control valve system disclosed herein is compatible with the electro-pneumatic latching valve system disclosed in U.S. patent application Ser. No. 10/784,171, the complete disclosure of which is hereby incorporated by reference.

In the exemplary embodiment shown in the Figures, each of the pistons further includes a sealing member in the form of an o-ring encircling the piston body to create a substantially air-tight union with the interior of valve body 12. Select piston 40 includes an o-ring 42, primary piston 60 includes an o-ring 62, and auxiliary piston 70 includes an o-ring 72. These o-rings are dynamic and move with their respective pistons.

Figure 2:
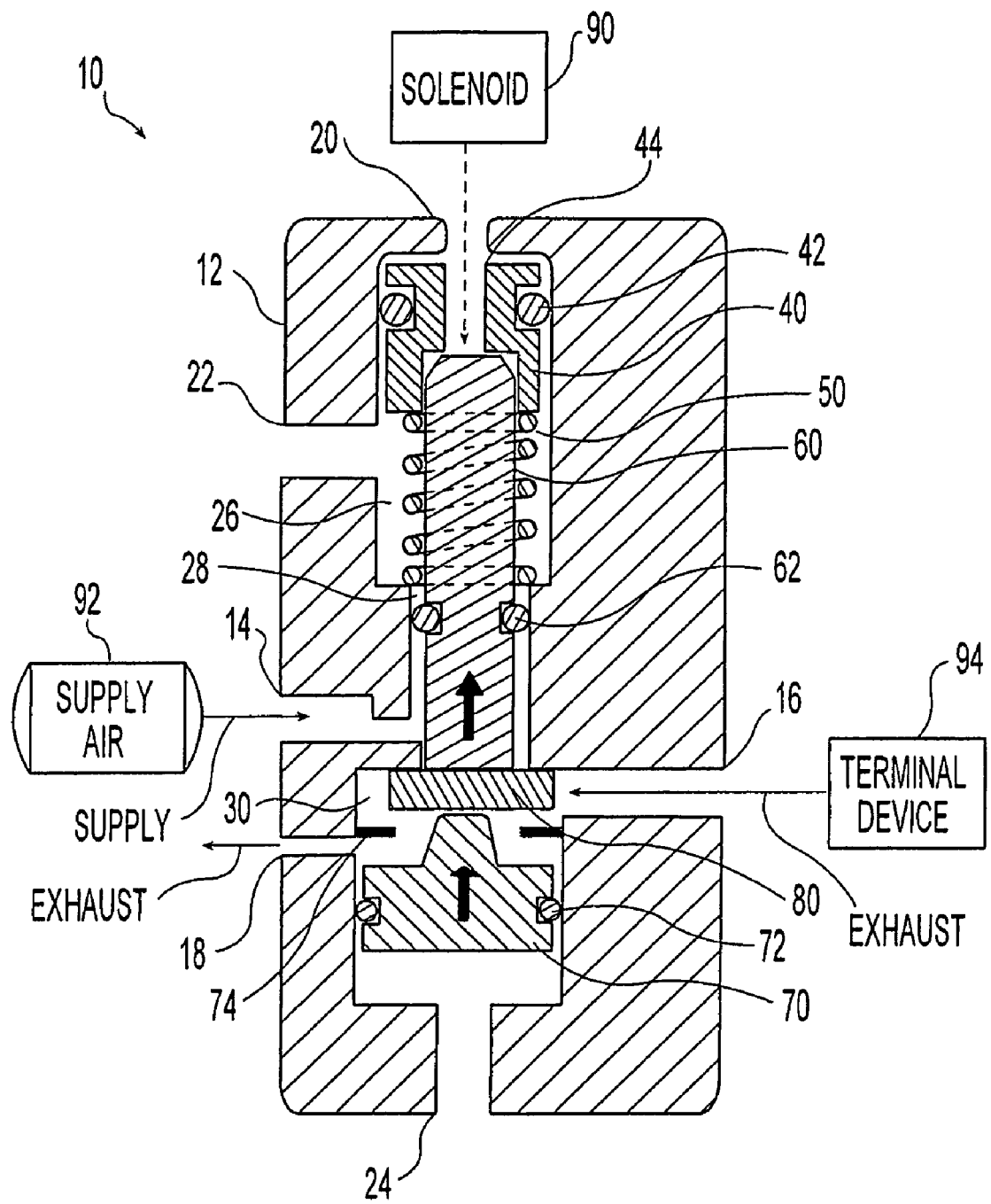
FIG. 2 is a cross-sectional view of an exemplary embodiment of the control valve of the present invention showing the valve in the off position.
Figure 3:
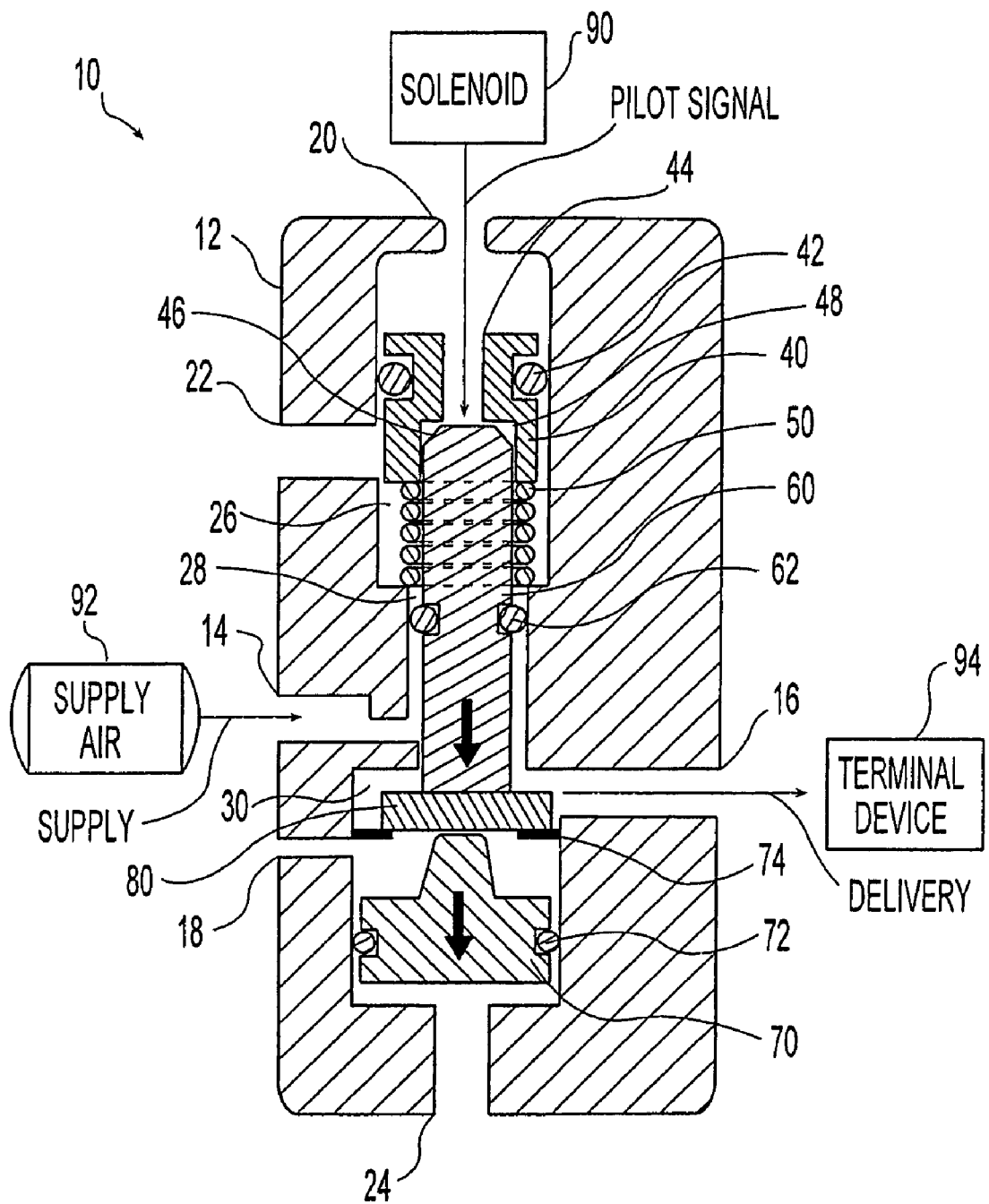
FIG. 3 is a cross-sectional view of an exemplary embodiment of the control valve of the present invention showing the valve in the on position.
Figure 4:
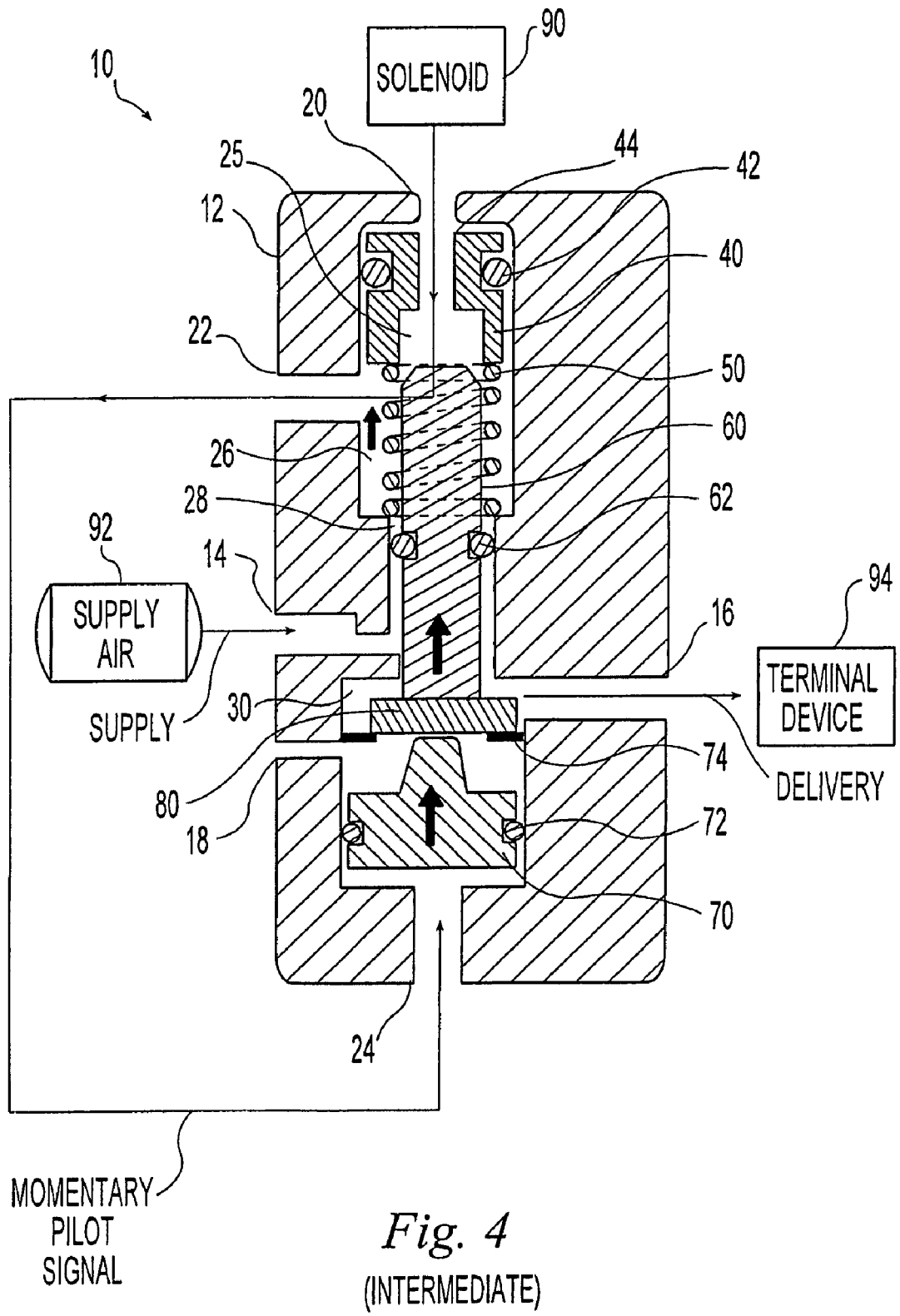
FIG. 4 is a cross-sectional view of an exemplary embodiment of the control valve of the present invention showing the valve in the intermediate or "ready" position.
Figure 5:
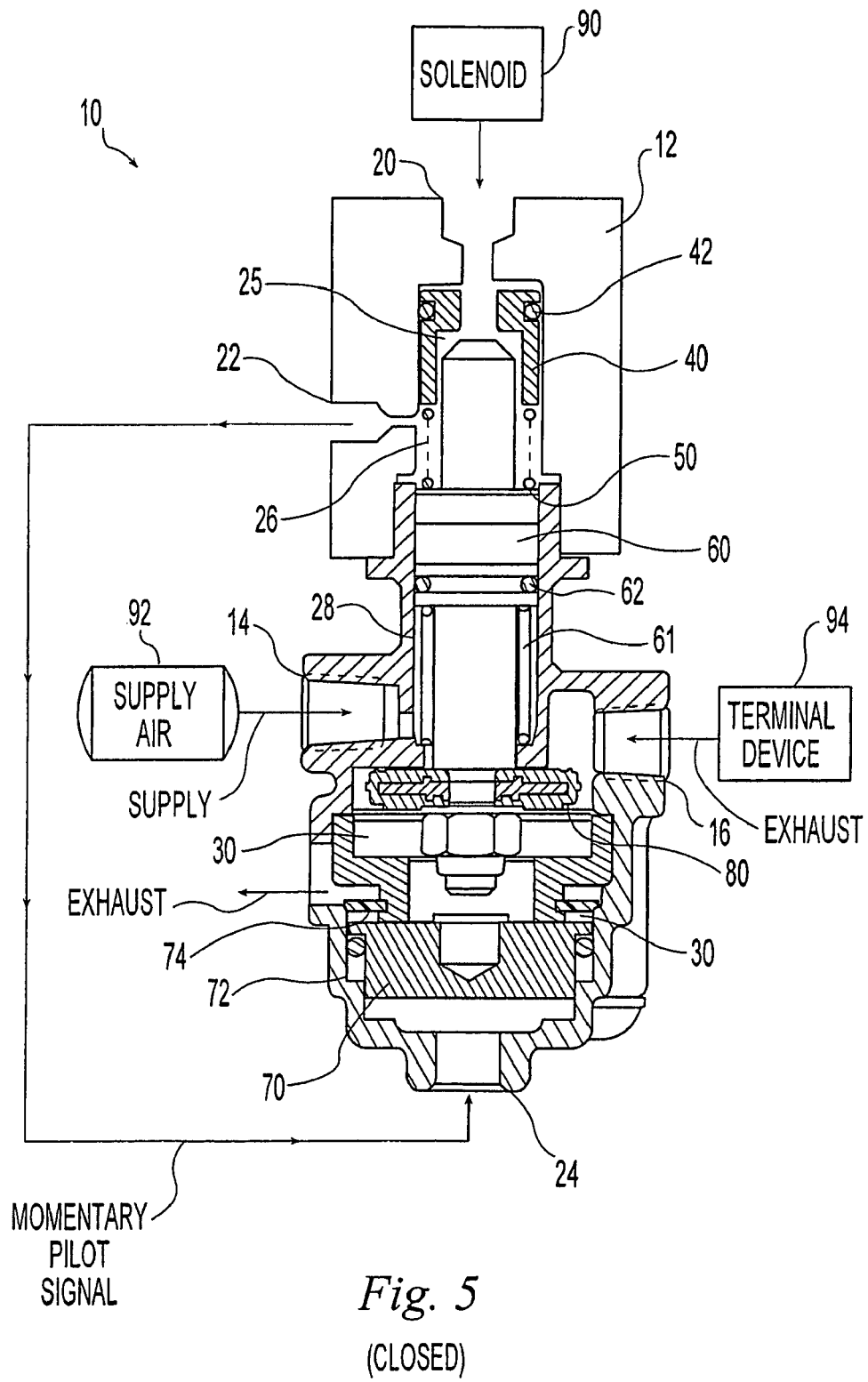
FIG. 5 is a cross-sectional view of an alternate exemplary embodiment of the control valve of the present invention showing the valve in the off position.

With reference to FIGS. 2-4, exemplary control valve 10 includes two basic operational states: "on" and "off", and an intermediate or "ready" state. Changing control valve 10 from on to off or vice versa is accomplished by delivering a momentary pilot air signal, i.e., a brief burst of air, through a single solenoid, pilot control valve, or other similar device 90 to first pilot air inlet 20. By way of analogy, the function of control valve 10 is similar to the action of an ink pen where one push of the button extends the ballpoint ink cartridge and a second push of the same button retracts the ballpoint ink cartridge.

In the first operational state (see FIGS. 2 and 5), control valve 10 is latched in the closed, off, or released position, meaning that pressurized air is not being delivered through the valve to spring brake or other terminal device 94. In the closed state, select piston 40 is in the "up" position within top chamber 26, primary piston 60 is in the "up" position within middle chamber 28 as is valve member 80, and auxiliary piston 70 is in the "up" position within bottom chamber 30. Supply air enters valve body 12, and the pressure differential between the diameter of the middle chamber and the diameter of the narrowed area just below supply port 14 maintains primary piston 60 in the "up" position such that the top edge of valve member 80, which may include a rubberized disc, seats against the bottom of middle chamber 28 and forms a seal. This seal prevents pressurized supply air from passing through the body of control valve 10 to delivery port 16. In the closed state, any pressurized air in terminal device 94 or valve body 12 is exhausted from control valve 10 through exhaust port 18.

In the second operational state (see FIG. 3), control valve 10 is latched in the open, on, or applied position, meaning that pressurized air is being supplied to the valve from pressurized air source 92 and delivered to pneumatic terminal device 94 through the body of control valve 10. In this open state, select piston 40 is momentarily in the "down" position within top chamber 26. In this position, shut-off seat 46 forms a seal with the top portion of primary piston 60, pilot air outlet 22 is blocked, and annular orifice 25 is eliminated. Because select piston 40 is seated against the top of primary piston 60, the force of the momentary pilot signal pushes both select piston 40 and the primary piston 60 down within their respective chambers. This downward movement also pushes valve member 80 and auxiliary piston 70 into the "down" position. Because valve member 80 now forms a seal with exhaust seat 74, and is no longer sealed against the bottom portion of middle chamber 28, supply air entering control valve 10 at supply port 14 passes through the body of the valve, exits through delivery port 16, and is delivered to terminal device 94. An internal pressure differential between o-ring 62 and the seal formed at exhaust seat 74 maintains piston 60 and valve member 80 in the "down" position.

In the intermediate or "ready" state (see FIG. 4), control valve 10 is typically on, i.e., delivering air to pneumatic terminal device 94 due to the positions of primary piston 60, valve member 80, and auxiliary piston 70 within their respective chambers. To prepare control valve 10 for the next change of state, a biasing member, referred to herein as "selection piston return spring 50" automatically returns select piston 40 to the "up" position within top chamber 26. When select piston 40 is returned to the "up" position in top chamber 26, the seal between the bottom portion of select piston 40 and the top portion of primary piston 60 is eliminated. Select piston 40 no longer blocks pilot air outlet 22 and annular orifice 25 is opened. The next momentary pilot signal received from device 90 (effecting a change of state) enters control valve 10 through first pilot air inlet 20, passes through select piston bore 44, enters annular orifice 25, and is diverted out of the control valve through pilot air outlet 22. The pilot air is then directed back into valve body 12 through second pilot air inlet 24 where it acts on auxiliary piston 70 and valve member 80 to return the valve to its off position. Control valve 10 will not change state, i.e., move back into the "on" position, until the next momentary pilot signal is received.

In the exemplary embodiment shown in FIGS. 2-5, control valve 10 utilizes external plumbing for directing the pilot air signals into and through piston body 12. Although not shown in the drawings, this plumbing can be in the form of tubes, conduits, or any other acceptable means for connecting the solenoid valve with the control valve and the various inlets and outlets with one another. In an alternate embodiment not shown in the Figures, the external pilot air plumbing is replaced with internal plumbing in the form of a passage that extends thought the bodies of primary piston 60, valve member 80, and auxiliary piston 70. In this alternate embodiment, pilot air outlet 22 is not included in valve body 12.

Because control valve 10 is either applied or released by momentary pilot air delivery from a single solenoid valve or the like, an indicator device 96 (see FIG. 1) may be incorporated into the system to monitoring and report the operational state of the control valve. This device permits the system or vehicle operator to known whether the control valve is in the applied or released state. In one embodiment, this device includes a double pole pressure switch (n.o./n.c.) controlling a double pole control switch. In another embodiment, a pressure gauge placed in the delivery circuit provides the desired information.

While the present invention has been illustrated by the description of exemplary embodiments thereof, and while the embodiments have been described in certain detail, it is not the intention of the Applicant to restrict or in any way limit the scope of the appended claims to such detail. Additional advantages and modifications will readily appear to those skilled in the art. For example, the control valve and control valve system of the present invention may be utilized for or included in pneumatic systems, hydraulic systems, or systems that include both pneumatic and hydraulic elements. Therefore, the invention in its broader aspects is not limited to any of the specific details, representative devices and methods, and/or illustrative examples shown and described. Accordingly, departures may be made from such details without departing from the spirit or scope of the applicant's general inventive concept.

What is claimed:

1. A control valve for use in a pneumatic system, comprising:
    a valve body, wherein the valve body further comprises:
        at least one supply port for communicating with a source of system operating air pressure;
        at least one delivery port for communicating with a spring brake;
        at least one exhaust port for communicating with atmosphere;
        at least one pilot air inlet for communicating with a source of control air pressure;
        a pilot air outlet; and
        an internal cavity comprising top, middle, and bottom chambers, wherein the top chamber is in communication with a first pilot air inlet and the pilot air outlet; the middle chamber is in communication with the at least one supply port; and the bottom chamber is in communication with the at least one delivery port, the at least one exhaust port, and a second pilot air inlet; and
    a first piston disposed within the top chamber and having a bore passing lengthwise therethrough;
    a first biasing member disposed within the top and middle chambers and defining an annular orifice therewith, wherein a second piston is in selective engagement with the first piston;
    a valve member connected to the bottom portion of the second piston;
    a third piston disposed within the bottom chamber beneath the valve member; and
    wherein a first positive control air pressure signal applied to the first pilot air inlet moves the valve member to a first position;
    wherein a second positive control air pressure signal applied to the first pilot air inlet moves the valve member to a second position; and
    wherein a second biasing member moves the valve member to the second position when the system operating air pressure received by the at least one supply port is below a predetermined pressure.

2. A method for changing the operational state of a control valve, comprising the steps of:
    receiving a system operating pressure from a source of pneumatic supply pressure;
    receiving a first momentary pilot pneumatic control signal from a single control device, the control valve being in a first operational state;
    changing from the first operational state to a second operational state in response to the first momentary pilot signal, wherein a delivery port of the control valve communicates with the system operating pressure while the control valve is in the second operational state; and
    maintaining the second operational state until at least one of a second momentary pilot signal is received from the single control device or the system operating pressure received from the source of pneumatic supply pressure is below a predetermined pressure, wherein the control valve changes back to the first operational state, the delivery port of the control valve communicating with atmosphere while the control valve is in the first operational state.

\* \* \* \* \*